US005184647A

United States Patent [19]

Goedecke et al.

[11] Patent Number: 5,184,647

[45] Date of Patent: Feb. 9, 1993

[54] VALVE BATTERY FOR GASEOUS FLUIDS

[75] Inventors: Wolf-Dieter Goedecke, Unterkirnach; Victor Cohanciuc, Villingen, both of Fed. Rep. of Germany

[73] Assignee: Mannesmann Aktiegesellschaft, Dusseldorf, Fed. Rep. of Germany

[21] Appl. No.: 866,022

[22] Filed: Apr. 9, 1992

[30] Foreign Application Priority Data

Apr. 9, 1991 [DE] Fed. Rep. of Germany ....... 4111890

[51] Int. Cl.[5] .............................................. F16K 11/00

[52] U.S. Cl. ...................................... 137/884; 417/46; 417/187

[58] Field of Search .................. 137/560, 884; 417/46, 417/187, 189

[56] References Cited

U.S. PATENT DOCUMENTS

| | | | |
|---|---|---|---|
| 4,078,574 | 3/1978 | Kosarzecki | 137/269 |
| 4,655,692 | 4/1987 | Ise | 417/187 |
| 4,687,021 | 8/1987 | Ise et al. | 137/884 X |
| 4,861,232 | 8/1989 | Ise et al. | 137/884 X |

FOREIGN PATENT DOCUMENTS

| | | |
|---|---|---|
| 0130548 | 1/1985 | European Pat. Off. . |
| 0391269 | 10/1990 | European Pat. Off. . |
| 2178139 | 2/1987 | United Kingdom . |

*Primary Examiner*—John C. Fox

*Attorney, Agent, or Firm*—Cohen, Pontani, Lieberman, Pavane

[57] ABSTRACT

A valve battery, including a plurality of base plates, each having a generally polygonal outer contour, a window-shaped recess therein, and two side faces, a face of one plate corresponding a face of an adjacent plate and sealingly engaging one another, closure plates being provided on the free end surfaces, a plurality of electrically actuatable individual valves mounted in the base plates, each having an inlet port, an outlet port, and an electrical connection, the mounted valves not protruding from the faces of the base plates, at least one of the base plates (4) having an associated vacuum device (31) and a compressed air connection (32) on one of the end surfaces for creating a vacuum, being interconnected for control by another of the said base plates (1) having one or more associated valves which are continuous valves (14), an inlet connection associated with each of the base plates, provided on one of the elongated side surfaces thereof, an outlet connection (A1-,A2) associated with each of the valves, in fluid communication with the outlet port of the associated valve on the lower side surface of the base plate, a channel provided in each of the base plates, extending generally parallel to the lower side surface, in fluid communication with the outlet connection of another base plate and the inlet port of each of the valves on the base plate, the electrical connection of the valves being brought together and extending out through a multiple pole central signal connection, and at least one of the base plates (4) having an associated vacuum device (31) and a compressed air connection (32) on one of the end surfaces for providing vacuum relief, being interconnected for control by another of the base plates (1) having one or more associated valves which are continuous valves (14).

8 Claims, 3 Drawing Sheets

13
21
25
22
22
19
19
18
18
I
P
P
I
23a
23a
23
23
6
6
14
14
24
R1
R2
P
P
17
17
11
A1
A2
32

VALVE BATTERY FOR GASEOUS FLUIDS

FIELD OF THE INVENTION

The present invention relates to a valve battery, particularly for gaseous fluids, consisting of a plurality of base plates which can be sealingly placed against one another. Each base plate has a polygonal outer contour, with closure plates provided on the corresponding end surfaces of the valve battery. Each base plate is provided with a plurality of electrically actuatable individual valves, the individual valves being adapted to be inserted or mounted within a window-shaped recess, and having a diameter or size in the thickness direction which is less than the thickness of the base plate. A pressure-fluid inlet connection is provided on one elongated side surface and a pressure-fluid outlet connection associated with each individual valve is provided on a lower side surface. A channel extending from the outlet connection and extending to the end surfaces of the valve battery connects the inlet channels of other individual valves for supplying pressurized medium. The electric connections for the individual valves are brought together in the window-shaped recess and exit therefrom by means of a multiple pole central signal connection.

BACKGROUND OF THE INVENTION

A valve construction of the aforementioned type is known from Federal Republic of Germany DE 39 17 242, corresponding to European Patent No. EP 0,391,269, expressly incorporated herein by reference. The prior art system, however, incorporates base plates which receive only on-off or directional valves. Such valve batteries are advantageous because they have a small structural size, a high rate of flow and a minimum weight. Furthermore, such valve batteries assure short switching times. In the prior art system of DE 39 17 242, the installation of individually controllable directional valves required the development of miniature solenoid valves from which unusually high flow rates are required. Such valve batteries permit a simple and rapid application to existing pressure-fluid systems and the control, for instance, of grippers, cylinders, rotary drives, handling devices, and the like.

The use of such valve batteries configured as on-off valves, which may be directional valves for regulating a servomotor is, however, not sufficient in certain cases for the necessary directional control processes. Thus, the known solution entirely lacks control functions, which are necessary in certain applications.

SUMMARY AND OBJECTS OF THE INVENTION

It is an object of the present invention to provide a solution to the problem of improving the known valve battery so that control functions can also be carried out.

The present invention provides at least one first base plate which receives one or more proportionally acting continuous valves, which is connected for control purposes with at least one second base plate which receives a vacuum device. A compressed-air connection is provided on the second base plate on one of the end surfaces or on an elongated side surface, and that a vacuum sensor is provided in the window-shaped recess of the second base plate.

The present invention obtains advantages by, in particular, increasing of number of possible functions of such a valve battery, so that, aside from switching functions of a base plate having only directional valves, control functions can also now be assumed, in which connection the small structural size, the high rate of flow and the minimum weight with low switching times are retained. The integrated pressure sensors are particularly advantageous in the present embodiments, and provide functionality which heretofore could only be realized only in separate pressure servovalves with integrated transducers. The valve battery according to the present invention therefore now permits a precise adjustment of vacuums and a rapid shifting of vacuums, and can be employed, for example, as tensile-stress control for foil webs, force-control drives, seal testing systems, blast-air controls and many other systems known to those of ordinary skill in the art. The different vacuums serve, in particular, for the rapid change of workpieces of different shape and/or different weight.

In accordance with another feature of the present invention, the continuous-valve base plate is provided in each case with vent lines debouching or opening into the elongated side surfaces.

Furthermore, it is advantageous that on the continuous-valve base plate, the electric connecting lines or wires are connected from the pressure sensors and the electromagnets associated with the valves to a multiple pole circular connector which is provided on the upper side surface.

Another aspect of the present invention provides that on the continuous-valve base plate, the pressure-fluid supply connections of two valves are connected with each other by means of a channel, and that a separate pressure sensor is connected to a pressure-fluid outlet connection, respectively, connected with one of the continuous valves.

The invention will be better understood and additional objects and advantages will become apparent from the following description taken in connection with the accompanying drawings.

BRIEF DESCRIPTION OF THE DRAWING

The preferred embodiments are shown by way of example in the accompanying drawings in which.

DETAILED DESCRIPTION OF THE PREFERRED EMBODIMENTS

Figure 2:
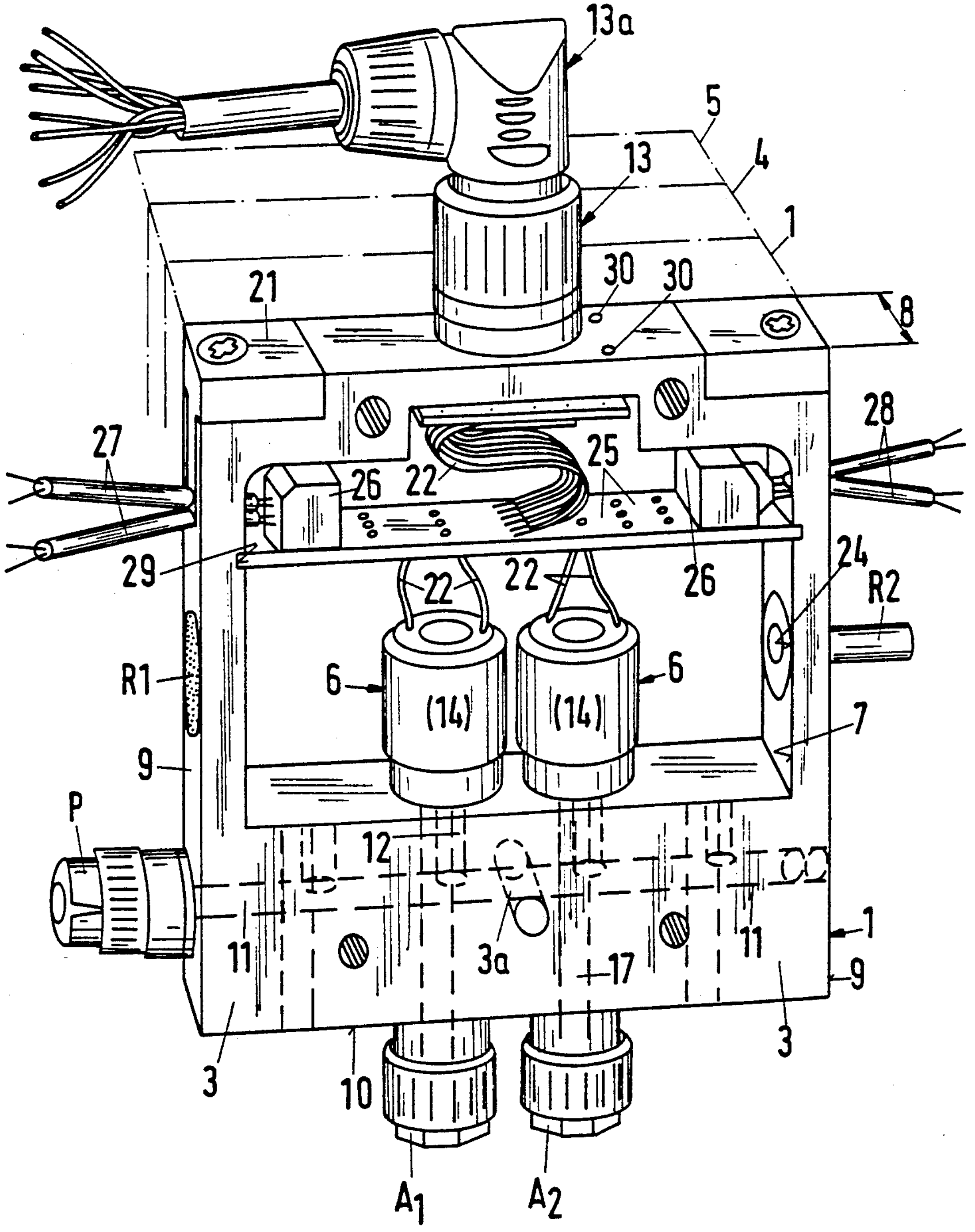
FIG. 2 is a perspective side view of a base plate with continuous valves.

A base plate 1 forming part of a valve battery and having a polygonal outer contour 2, i.e. a rectangular outer contour as shown in the drawing, is assembled together with a vacuum valve base plate 4 associated with one or two end surfaces 3, indicated in FIG. 2 in dotted lines. The end surfaces 3, in particular the connecting channels 3*a* debouching into the end surfaces 3 are sealed off. On both sides of the continuous base plates 1 or vacuum valve base plates 4, there are provided end plates 5 which serve for the attachment of the valve battery.

Figure 3:
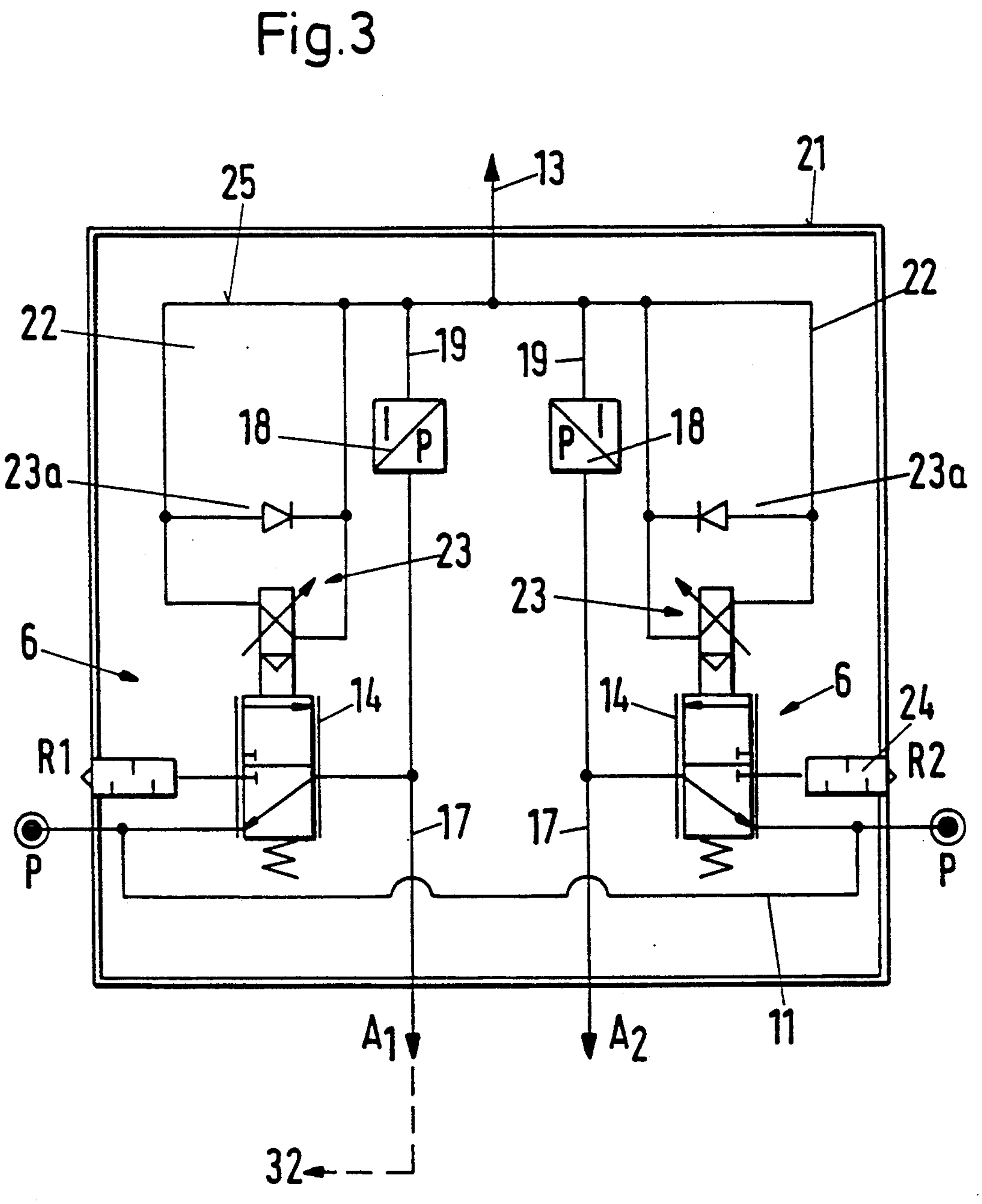
FIG. 3 is a block diagram, corresponding to FIG. 2, of the electronic and pneumatic pressure control.

Each base plate 1 has one or more, two being shown in FIGS. 2 and 3 electrically actuatable individual valves 6 which can be inserted within a window-shaped recess 7 or aperture provided in the base plate 1. The individual valves 6 have a diameter which is less than the thickness 8 of the base plate 1, so that no portion thereof protrudes beyond the end surfaces of the base plate. On the elongated side surfaces 9, there are provided a pressure-fluid connection P and vent connections R1 and R2 provided respectively on different sides of the base plate 1. On the lower side surface 10 are provided pressure-fluid outlet connections A1 and A2 associated with each individual valve 6. A channel 11 extending from the pressure fluid connection P and proceeding parallel to the end surfaces 3 connects the inlet channels 12 for the pressure supply of all individual valves 6. The electrical connections for the individual valves 6 are brought together in the window-shaped recess 7 and conducted out of the base plate 1 by means of a multiple pole central signal connector 13.

The base plate 1 may contain, as a special feature of the present invention, continuous valves 14. In this connection, the outer contour 2 of all base plates 1 and 4 is the same. The window-shaped recesses can have different shapes depending on the outside dimensions and the number and shape of the continuous valves 14. The continuous valves 14 are provided alongside of each other, aligned generally parallel to the channel 11.

Outlet connections A1,A2 debouch or open on the elongated side surfaces 10. Pressure sensors 18 are connected in fluid communication with the pressure lines 17 leading to the outlet connections A1, A2. Their electric connecting lines extend to the multiple pole circular connector 13*a*, which is arranged on the upper side surface 21. Electric connecting lines 22 also extend from controllable electromagnets 23 of the continuous valves 14 to the multiple pole circular connector 13*a*. Rectifying diodes 23*a* are connected between the connecting terminals of the electromagnets 23 as quenching diodes.

As shown in FIGS. 2 and 3, it is also noted that a sound damper 24, a circuit board 25, connecting banks 26 and connecting lines 27 and 28 for the current supply of the electromagnets 23 are also provided in the window-shaped recess 7 of the base plate 1. The circuit board 25 is fastened in grooves 29 provided in the side walls of the base plate, as shown in FIG. 2. On the upper side surface 21, alongside the circular connector 13*a*, there are provided light-emitting diodes 30 each of which is associated with a continuous valve 14, for providing visual feedback of an operational state of the associated valve.

Figure 1:
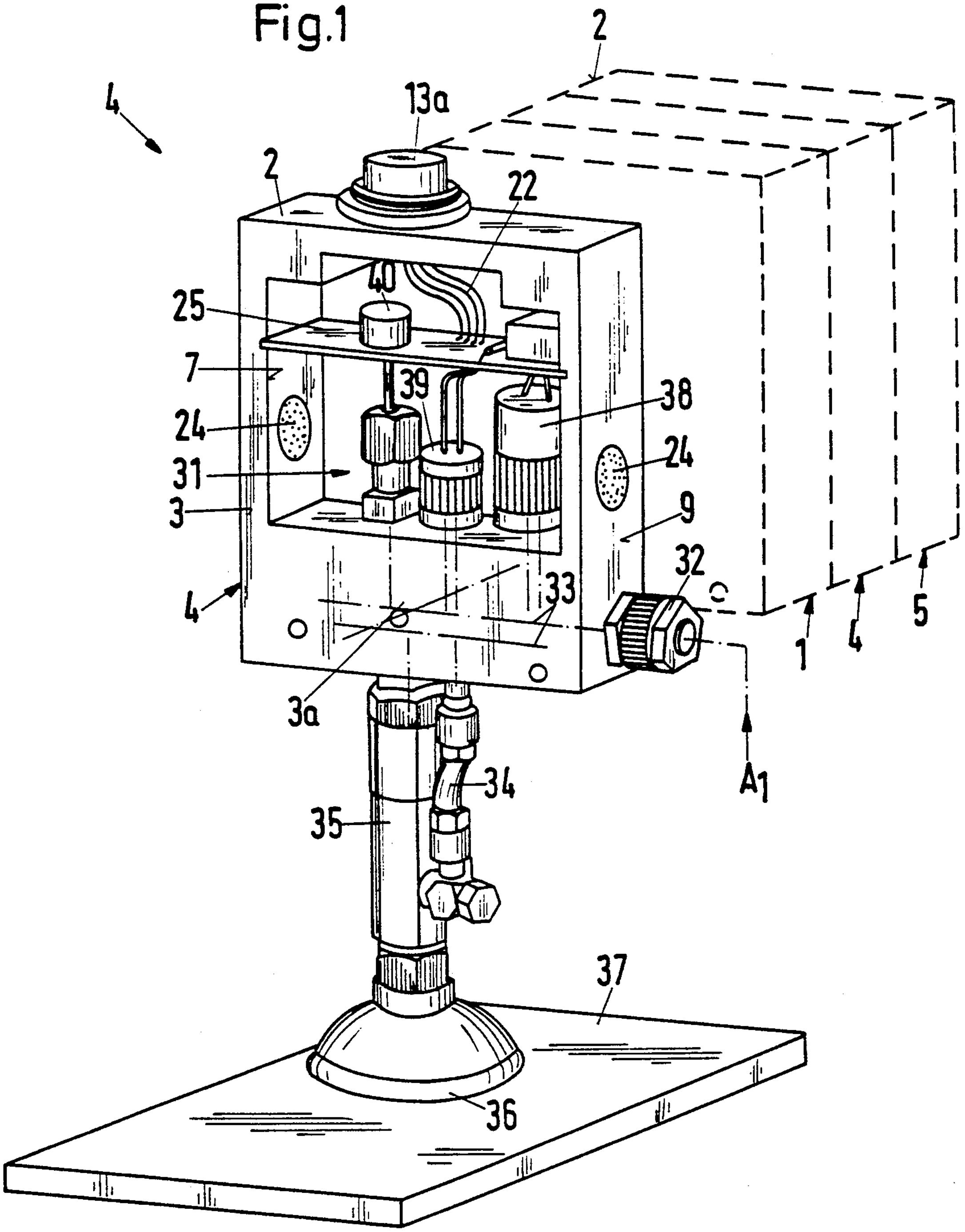
FIG. 1 is a perspective side view of a base plate with a vacuum device.

FIG. 1 shows a vacuum device 31, contained in the window-shaped cutout 7, which has the same form factor as the continuous base plate 1. A central pressure fluid connection 32 is connected to a channel system 33. The pressure fluid connection 32 is fed by, for example, a controllable source of compressed air, such as a continuous valve 6 of an adjacent continuous base plate 1, to pressurize the channel system 33. The compressed air flows, when the associated valving arrangement so permits, through a line 34 so that a vacuum in the line 35, connected to the suction gripper 36 is created, and the workpiece is thereby firmly held for transport. The flow or blast of compressed air from the central pressure fluid connection 32 is controlled by the switch 39, which may, for example be an on/off valve (14). The vacuum is controlled in accordance with vacuum sensor 38 and another vacuum sensor 40, and is transmitted to the line 34. The line 35 vents the flowing air to the window-shaped recess 7, which further allows the escape through the vent connections R1 and R2 with sound dampers 24 provided on sides of the base plate 4.

The thus supplied vacuum in the vacuum gripper 36 grips a workpiece 37 to securely hold the workpiece 37 during transport. The vacuum is thus controlled by pneumatic switch elements 38, 39 and 40.

Above the switch elements 38, 39 and 40, is provided the circuit board 25 from which the connecting lines 22 extend to the circular connector 13*a*.

The continuous-valve base plate 1 can be operated entirely separately from the vacuum-device base plate 4. However, it is advantageous for many applications to add the continuous-valve base plate 1 to the vacuum-device base plate 4 from a control standpoint as described hereinabove in order to superimpose a pressure control provided by the continuous-valve base plate 1 on the vacuum control provided by the vacuum-device base plate 4 and thus for a short time to be able to produce different vacuums which are finely controlled and measurable.

The present invention claims priority from German Patent Application No. P 41 11 890.1, filed Apr. 9, 1991, the entirety of which is expressly incorporated herein by reference. An English language translation of said German Patent Application No. P 41 11 890.1 is attached hereto as Appendix and forms part of this disclosure.

It should be understood that the preferred embodiments and examples described are for illustrative purposes only and are not to be construed as limiting the scope of the present invention which is properly delineated only in the appended claims.

What is claimed is:

1. A valve battery, comprising:

a plurality of base plates, each having a generally polygonal outer contour comprising a top side, a bottom side, and two elongated sides, a window-shaped recess, means for closing said window-shaped recess, a thickness, a first face a second face, said first face of one of said plates corresponding to said second face of an adjacent base plate so as to sealingly engage when placed together, said plurality of plates having end surfaces;

a plurality of electrically actuatable valves, at least one of said valves being provided in association with each of said base plates, having an inlet port and an outlet port, and an electrical connection, said valves being shaped having an outer dimension which is smaller than said thickness of said base plates so that said valves do not protrude beyond said first and second faces of said associated base plate when mounted therein;

at least one of said base plates (4) having an associated vacuum valve device (31) and a compressed air connection (32) on one of said end surfaces, being interconnected for control by another of said base plates (1) having a continuous valve (14);

a pressure-fluid inlet connection associated with each of said base plates, provided on one of said elongated sides;

a pressure-fluid outlet connection (35,A1,A2) associated with each of said valves, in fluid communication with said outlet port of said associated valve, provided on said lower side of said base plate associated with said associated valve;

a channel provided in said base plates, extending generally parallel to said faces of said base plates, in fluid communication with said pressure-fluid outlet connection of one of said base plates and said inlet port of each of said valves associated with said base plate;

a vacuum sensor (40) located in said window-shaped recess, being provided in fluid communication with said pressure fluid outlet connection of said vacuum valve device (31);

said electrical connection of each of said valves of said associated base plate being brought together in said window-shaped recess and extended out of it through a multiple pole central signal connection.

2. The valve battery according to claim 1, wherein said continuous-valves (1) are provided with vent lines (R1, R2) venting to the elongated sides (9).

3. The valve battery according to claim 2, further comprising pressure sensors (18) in fluid communication with said outlet ports of said continuous valves having electrical connections and electromagnets of said continuous valves having electrical connections, wherein said electrical connections (22) of said pressure sensors (18) said electrical connections of said electromagnets (23) are coupled through said continuous-valve base plate (1) to a multiple pole circular connector (**13*a*) located on said upper side (21**).

4. The valve battery according to claim 3, further comprising a pressure sensor (18) in fluid connection with said pressure-fluid outlet connections (A1, A2) of said continuous valve, wherein said channel of one of said base plates has a port communicating with a corresponding port of an adjacent base plate.

5. The valve battery according to claim 2, further comprising a pressure sensor (18) in fluid connection with said pressure-fluid outlet connections (A1, A2) of said continuous valve, wherein said channel of one of said base plates has a port communicating with a corresponding port of an adjacent base plate.

6. The valve battery according to claim 1, further comprising pressure sensors (18) in fluid communication with said outlet ports of said continuous valves having electrical connections and electromagnets of said continuous valves having electrical connections, wherein said electrical connections (22) of said pressure sensors (18) said electrical connections of said electromagnets (23) are coupled through said continuous-valve base plate (1) to a multiple pole circular connector (**13*a*) located on said upper side (21**).

7. The valve battery according to claim 6, further comprising a pressure sensor (18) in fluid connection with said pressure-fluid outlet connections (A1, A2) of said continuous valve, wherein said channel of one of said base plates has a port communicating with a corresponding port of an adjacent base plate.

8. The valve battery according to claim 1, further comprising a pressure sensor (18) in fluid connection with said pressure-fluid outlet connections (A1, A2) of said continuous valve, wherein said channel of one of said base plates has a port communicating with a corresponding port of an adjacent base plate.

* * * * *